Figure 1:
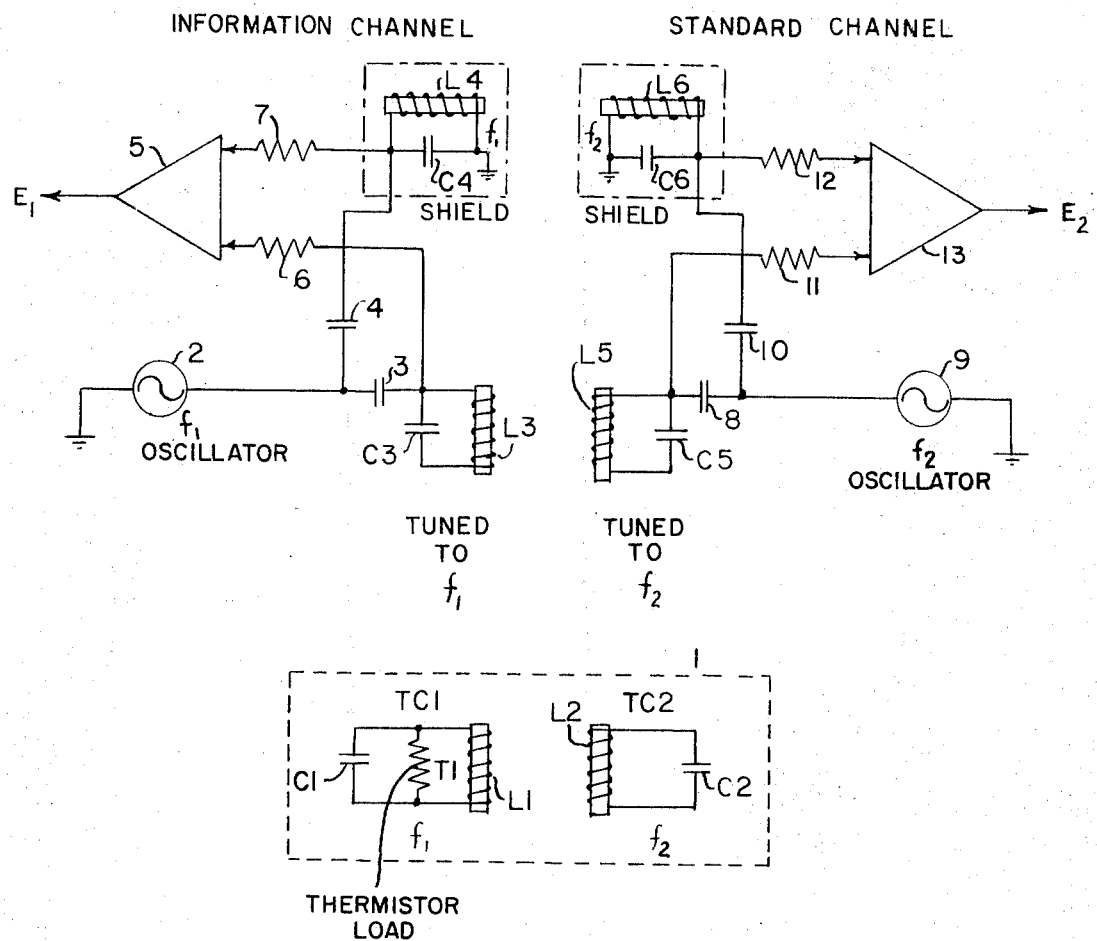

United States Patent

Brumbelow

[15] 3,656,132
[45] Apr. 11, 1972

[54] REMOTE MONITOR SYSTEM

[72] Inventor: Joseph S. Brumbelow, P.O. Box 447, Wakefield, Mass. 01880

[22] Filed: May 26, 1970

[21] Appl. No.: 40,488

[52] U.S. Cl. ........................... 340/189, 325/8, 340/152 T, 340/195
[51] Int. Cl. .................................................. G08c 19/04
[58] Field of Search .............. 340/189, 152 T, 195; 325/8

[56] References Cited

UNITED STATES PATENTS

| | | | |
|---|---|---|---|
| 2,818,732 | 1/1958 | Bennett | 340/189 |
| 3,018,475 | 1/1962 | Kleist | 340/152 T |
| 3,293,595 | 12/1966 | Takami | 340/195 |
| 3,338,100 | 8/1967 | Takami | 340/195 |

*Primary Examiner*—Thomas B. Habecker
*Attorney*—Louis Orenbuch

[57] ABSTRACT

A system for remotely monitoring the changeable state of a moveable subject employs an illuminator having an electrical resonator which establishes an oscillating "near" magnetic field over the area to be monitored. The illuminator's resonator is driven into resonance and a sensor provides an information signal that is a measure of the oscillatory energy in the resonator. The monitored subject carries a pair of resonant circuits tuned to be set into resonance by inductive coupling to a near magnetic field. One of the resonant circuits is arranged so that its resonant frequency or its energy dissipation (Q) is affected by variations of the monitored state. When at resonance, that resonant circuit causes a change in the oscillatory energy in the illuminator's resonator which is detected by the sensor and appears in the information signal. The other resonant circuit carried by the monitored subject is insensitive to the monitored state and is tuned to a frequency different from the resonant frequency of the sensitive resonant circuit. When at resonance, the insensitive circuit causes a change in oscillator energy in a resonator which supplies energy to that circuit through a "near" magnetic field. The energy change is detected and a "standard" signal is obtained with which the information signal is compared.

3 Claims, 5 Drawing Figures

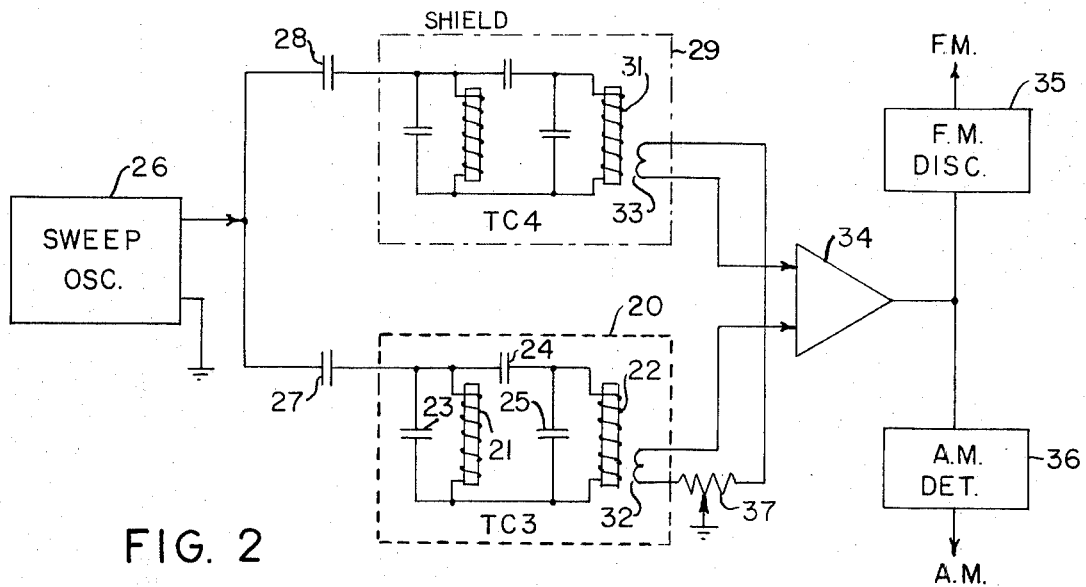
FIG. 2
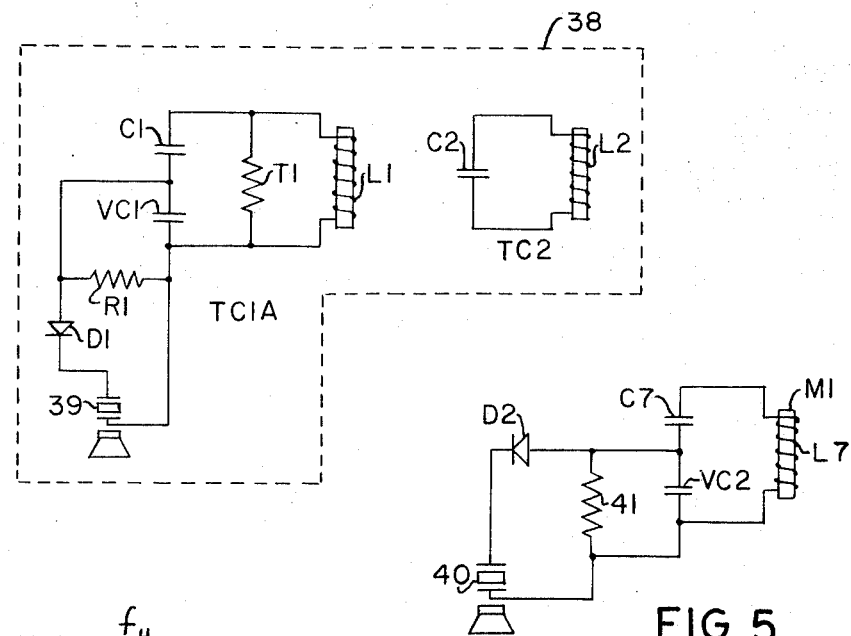
FIG. 3
FIG. 5
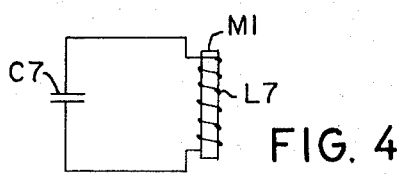
FIG. 4
INVENTOR
JOSEPH S. BRUMBELOW
BY Louis Orenbuch
ATTORNEY 3,656,132

REMOTE MONITOR SYSTEM

FIELD OF THE INVENTION

This invention relates in general to apparatus for remotely monitoring the physical condition of a person or the condition of an object which is movable within a relatively confined space. More particularly, the invention pertains to apparatus that does not encumber the person or object to an appreciable extent and permits freedom of movement of the monitored subject within the "near field" of an illuminator device.

BACKGROUND OF THE INVENTION

It is often desirable to monitor the physical condition of a person by measurement of the body temperature, blood pressure, or heart beat while permitting the person to move about freely within a designated area. Similarly, situations arise where it is desired to monitor functions of an object such as a machine while permitting the object to be moved within a known area. Prior electrical monitoring systems have either required the attachment of cables or wires to the apparatus carried by the monitored subject or have relied upon portable batteries to provide the requisite electrical power. Cables or wires impede the movement of the monitored subject and present a hazard to traffic in the monitored area. Portable batteries must, when exhausted, be recharged or replaced and in general present an undesirable load which must be carried about with the monitored subject.

OBJECTIVE OF THE INVENTION

The principal objective of the invention is to provide a system in which monitoring is effective within a space determined by the near field of an illuminator and in which the apparatus carried by the monitored subject is passive in the sense that the requisite electrical power is supplied by the remotely located illuminator. The monitored subject is free, therefore, to move within the near field area without being encumbered by cables or wires and without having to be accompanied by a portable power source.

THE DRAWINGS

The invention, both as to its arrangement and mode of operation, can be better understood from the exposition which follows when it is considered in conjunction with the accompanying drawings in which:

FIG. 1 diagramatically depicts the scheme of a rudimentary form of the invention;

FIG. 2 diagramatically illustrates the scheme of the preferred embodiment of the invention;

FIG. 3 depicts an oscilloscopic trace synchronized with the sweep of the swept oscillator;

FIG. 4 symbolizes a tuned circuit having a temperature sensitive ferrite core inductor; and FIG. 5 depicts a circuit for simultaneously monitoring body temperature and heart beat rate.

THE EXPOSITION

A rudimentary form of the invention is schematically shown in FIG. 1. For ease of exposition, it is here assumed that the apparatus is used to continuously monitor a patient's body temperature. It should be understood, however, that the invention can also be employed to monitor the functions of inanimate devices whose position within the monitored area is changeable. The apparatus within block 1 is carried upon the patient and includes a tuned circuit TC1 having an inductor L1 connected to a capacitor C1 and a thermistor T1. The inductor L1 and capacitor C1 are of such values that the circuit resonates at a frequency $f_1$. The capacitor C1 may be of the variable capacitance type to facilitate tuning of the circuit to the $f_1$ frequency. Preferably the frequency $f_1$ is within the 25kHz to 100kHz range. The inductor L1, for this frequency range consists of a coil wrapped around a ferromagnetic core. The thermistor T1 is a variable resistor whose resistance is a function of temperature and the thermistor is situated upon the patient to cause it to be brought to the patient's body temperature and to follow the changes in that temperature.

A second resonant circuit TC2 tuned to frequency $f_2$ is also carried by the patient. The second circuit employs a capacitor C2 connected to an inductor L2 and the circuit TC2 is arranged on the patient so that it is not affected by nor does it affect tuned circuit TC1.

Apparatus is provided within the area to be monitored which illuminates the area to be monitored with magnetic fields varying at the $f_1$ and $f_2$ frequencies. Those fields are herein termed "near" fields and the effective extent of such fields depends, inter alia, upon the magnitude of the currents creating the magnetic fields. The illuminating apparatus for furnishing the $f_1$ near field utilizes a capacitor C3 and an inductor L3 connected in parallel to constitute a circuit that is resonant at the $f_1$ frequency. The inductor $L_3$, preferably, is formed by a coil wound upon a ferromagnetic core. A signal source 2 is coupled through a coupling capacitor 3 to the L3-C3 circuit and provides a signal that causes the circuit to resonate at the $f_1$ frequency. Preferably, the signal source is a stable oscillator. The output of signal source 2 is also coupled, by capacitor 4, to a circuit L4-C4 that is identical to the L3-C3 circuit except that the L4-C4 circuit is enclosed within a radiation shield to prevent coupling to the L3-C3 circuit. A differential amplifier 5 has one input connected through resistor 6 to the L3-C3 circuit and has its other input connected through resistor 7 to the L4-C4 circuit. Where the two inputs are of equal amplitude and have the same phase, the inputs are in balance and the output of the amplifier $E_1$ is a null. Where the input signal from the L3-C3 circuit changes while the input signal from the L4-C4 circuit remains constant, the difference in the input signals is amplified and appears in the output $E_1$ of amplifier 5.

Assuming the TC1 circuit carried by the patient is within the near $f_1$ field, the inductor L1 is then magnetically coupled to the L3 inductor. The effectiveness of the coupling is subject to the distance between the inductors and the attitude of the L1 inductor which determines its linkage with the flux of the near field. The TC1 circuit, being tuned to the $f_1$ frequency, becomes resonant by absorbing energy from the L3-C3 tank. The amount of energy dissipated in the resonant TC1 circuit, in turn, is determined by the resistance of thermistor T1 and thus depends upon the patient's body temperature. A change in resistance of thermistor T1 changes the amount of energy absorbed from the L3-C3 tank and thereby changes the output $E_1$ of the differential amplifier. Where the TC1 circuit is fixed in position so that its distance from the illuminator does not vary and the attitude of inductor L1 remains constant, the output $E_1$ of the differential amplifier can be calibrated to obtain the patient's body temperature as that parameter then has an ascertainable relation to the energy absorbed from the L3-C3 tank. However, where the patient is permitted to move about so that the attitude of the inductor L1 and its distance from the illuminator are not constant, a change in the output $E_1$ of the amplifier 5 may then be due (1) to a change in distance, (2) a change in attitude, or (3) a change in the patient's temperature or any combination of those variables.

To permit the change in the output $E_1$ which is due to the patient's temperature to be distinguished from the effects due to the movement of the patient, an $f_2$ near field is established by a resonant circuit employing an inductor L5 and a capacitor C5. The L5-C5 resonant circuit is coupled through capacitor 8 to a signal source 9 which maintains that circuit at resonance. The output of source 9 is also coupled, by capacitor 10, to a similar resonant circuit L6-C6 which is enclosed within a radiation shield to prevent coupling to the L5-C5 circuit. Outputs from the L5-C5 and L6-C6 resonant circuits are coupled by resistors 11 and 12 to the inputs of a differential amplifier 13 having an output $E_2$.

Where the TC2 circuit carried by the patient is within the near $f_2$ field, inductor L2 is magnetically coupled to the L5 inductor of the $f_2$ illuminator. Because the TC2 circuit is unaffected by the patient's body temperature (that is, the Q of the TC2 circuit is a constant), the energy absorbed by the TC2 circuit from the L5–C5 tank is determined principally by the patient's distance from the illuminator and the attitude of the L2 inductor relative to the $f_2$ field.

The tuned circuits TC1 and TC2, preferably, are located on the patient in a manner such that inductors L1 and L2 are parallel and are sufficiently separated so that neither inductor couples to any appreciable extent to the other. The inductors may, for example, be located in a head band worn by the patient whereby the attitude of both inductors is equally affected by the patient's movement. Preferably, the illuminators supplying the $f_1$ and $f_2$ near fields are located adjacent to one another whereby a change in distance of the patient from the illuminators has the same effect upon the $E_1$ and $E_2$ outputs.

The $E_1$ output is a function of three variables, i.e., the patient's body temperature, the distance of tuned circuit TC1 from the $f_1$ illuminator, and the attitude of inductor L1 with respect to the $f_1$ field. The $E_2$ output is a function of two variables, i.e., the distance of tuned circuit TC2 from the $f_2$ illuminator and the attitude of inductor L2 with respect to the $f_2$ field. By utilizing the $E_2$ output as a "standard", a comparison of the $E_1$ output with the "standard" output yields a signal that is a measure of the patient's body temperature. The $f_2$ frequency is therefore termed the "standard" channel and the $f_1$ frequency is termed the information channel.

FIG. 2 diagramatically depicts the scheme of the preferred embodiment of the invention. The FIG. 2 embodiment is an improvement upon the rudimentary FIG. 1 system inasmuch as it permits two parameters to be monitored simultaneously. For expository purposes, the FIG. 2 embodiment is here described in relation to monitoring the patient's body temperature and heart beat rate. In the FIG. 2 embodiment, the illuminator 20 employs a broad band resonant circuit TC3 here illustrated as being constituted by inductors 21, 22 wound upon ferromagnetic cores and by capacitors 23, 24, and 25. The circuit is resonant over a band $f_L$ to $f_H$, where $f_L$ designates the low frequency edge of the band and $f_H$ designates the high frequency band edge. Preferably, the resonance characteristic of the circuit is flat over the band in order to avoid the necessity for compensating for a different resonant characteristic. A sweep oscillator 26 is coupled through a coupling capacitor 27 to the broad band resonant circuit and repetitively sweeps through the $f_L$-$f_H$ band. The output of the sweep oscillator is also coupled through capacitor 28 to a resonant circuit TC4 which is, preferably, substantially identical to resonant circuit TC3 and is thus resonant over the band $f_L$-$f_H$ and has the same resonance characteristics. The tuned circuit TC4 is enclosed within a shield 29 to confine the magnetic field emanating from that circuit.

A coil 32 is inductively coupled to the winding 22 in resonant circuit TC3 and another coil 33 is inductively coupled to the winding 31 in tuned circuit TC4. Each of those coils senses the energy in the associated tank. Sensing coils 32, 33 provide the inputs to a differential amplifier 34 having its output applied to a frequency modulation discriminator 35 and an amplitude modulation detector 36. The sensing coils are connected to a potentiometer 37 to permit the signals across those coils to be "nulled," viz., to present equal inputs to the differential amplifier.

The apparatus carried by the patient is enclosed within block 38. Tuned circuit TC2 is resonant at frequency $f_2$, as previously described in connection with the FIG. 1 embodiment. Tuned circuit TC1 has been modified by the addition of a voltage variable capacitor VC1 whose capacitance is governed by the voltage generated by a crystal microphone 39. The diode D1 prevents the crystal microphone from forwardly biasing the voltage variable capacitor VC1. The piezoelectric crystal of the microphone, in response to the sound of the heart's beat, provides a voltage that alters the capacitance of capacitor VC1. In the absence of a signal from the crystal microphone, capacitors C1, VC1 and inductor L1 cause the circuit to resonate at a frequency $f_1$ within the band $f_L$-$f_H$. The voltage produced by the crystal of the microphone alters the capacitance of capacitor VC1 and thereby shifts the resonant frequency of circuit TC1A by an amount of $\Delta f$. Thus, the frequency at which circuit TC1A becomes resonant is determined by $f_1+\Delta f$. Consequently, as the oscillator sweeps from $f_L$ to $f_H$, a drop in energy in the tank of resonant circuit TC3 occurs when tuned circuit TC1A is set into resonance by its inductive coupling to the near field of the illuminator. The energy dissipated in tuned circuit TC1A depends, as in the FIG. 1 embodiment, upon the resistance of thermistor T1. The input signals to the differential amplifier therefore result in an amplitude modulated output signal which is detected by detector 36 to obtain a D.C. signal that is a measure of the patient's temperature. When the crystal microphone is activated by the patient's heart beat, the amplitude modulation of the thermistor T1 is, in effect, imposed upon a frequency modulated carrier. The frequency modulation, however, has but an inappreciable effect upon the dissipation of energy in the TC1A resonant circuit.

Where the output of amplifier 34 is utilized to control the vertical deflection of an oscilloscope and the horizontal deflection is synchronized with the sweep of sweep oscillator 26, a trace similar to that shown in FIG. 3 is obtained. The trace is substantially flat until the TC1A circuit becomes resonant and draws energy from the TC3 tank. Assuming circuit TC1A becomes resonant at frequency $f_1$, a spike occurs in the trace as the sweep passes through the $f_1$ frequency. Where the crystal microphone causes a change in capacity of capacitor VC1, the next appearance of the spike is shifted by an amount $\Delta f$, indicating that circuit TC1A is then resonant at frequency $f_1+\Delta f$. A second spike occurs in the trace at frequency $f_2$ when the TC2 circuit becomes resonant by inductive coupling to the near field of the illuminator. By comparing the amplitude of the $f_2$ spike with the amplitude of the first occurring spike, the patient's temperature can be obtained. The departure of $\Delta f$ from the $f_1$ frequency is due to the patient's heart beat and thus provides information as to the heart beat rate. The repetition of the sweep of oscillator 26 determines the rate at which the patient's heart rate is sampled. The characteristic of a single heart beat can be obtained by sampling at an adequately high rate. Where the rate of sampling is sufficiently high, the crystal microphone may also be used for voice communication with the monitoring station which can be remotely located from the illuminator. Thus, for example, the illuminator and amplifying apparatus can be located in the ceiling of a room and be connected by suitable transmission lines to a remotely located station having apparatus for displaying and recording the monitored parameters.

The FM discriminator 35 converts the frequency variations in the output of amplifier 34 to amplitude variations to facilitate recording the patient's heart beat in a permanent form such as on an X–Y chart. It should be noted that any external agency which disturbs the resonant frequency of tuned circuit TC1A is also likely to affect tuned circuit TC2 and alter its resonant frequency from the preset $f_2$ frequency. Therefore, the system can be arranged to sound an alarm to indicate interference with the system in the event of a change of frequency in the "standard" $f_2$ channel. As the apparatus carried by the patient does not require its own independent power supply and is able to indicate interference by an external agent, the system is highly reliable. Thus, for example, where the patient deliberately or inadvertently removes the apparatus from his person, the change due to body capacity may cause a sufficient departure from the $f_2$ resonant frequency to actuate the alarm.

Where it is desired to monitor a single physical condition of the patient by frequency modulation, the embodiment of FIG. 2 can be simplified by eliminating the A.M. detector 36. Further, tuned circuit TC2, normally carried by the patient, can be eliminated and the extent of the band swept by oscillator 26 can be narrowed as it is not then necessary to sweep through the $f_2$ frequency. For example, where only the body temperature is to be monitored, the patient need carry only the resonant circuit shown in FIG. 4 which consists of a capacitor C7 connected to an inductor L7 formed by a winding wrapped around a ferrite core M1. The ferrite core is constituted by a material whose magnetic permeability varies as a function of temperature. Such a material, for example, is the manganese-zinc ferrite referred to on page 252 of the book Ferrites by Smit and Wijn, John Wiley & Sons Inc. 1959. Preferably a ferrite material is selected whose magnetic permeability varies linearly with temperature over the range of body temperatures expected to be encountered. The circuit L7–C7 is tuned to resonate at a frequency $f_1$, when the core temperature is, let us say, at 98.6° F. To facilitate tuning of the circuit, capacitor C7 may be of the variable capacitance type or the core may be made physically adjustable with respect to its winding. The inductor is placed in contact with the body of the subject in a manner causing the core to attain body temperature and to follow changes in that temperature. Where the body temperature is a 98.6° F, tuned circuit L7–C7 is set into resonance at frequency $f_1$ by absorbing energy from the tank of the illuminator 20. The voltages induced across coils 32 and 33 become unbalanced as the oscillator sweeps through frequency $f_1$ and the amplifier 34 thereupon emits a signal in response to its unbalanced inputs. Where the patient's body temperature rises above the normal (i.e., 98.6° F), the permeability of the ferrite core increases and where the temperature falls below the normal, the permeability of the ferrite core decreases. The change in magnetic permeability of the ferrite core causes the resonant frequency of the L7–C7 circuit to be altered by an amount related to the temperature deviation. Thus the L7–C7 circuit becomes resonant at a different point in the sweep of oscillator 26 and causes an alteration in the output of discriminator 35. It should be noted that the shift in frequency of the L7–C7 resonant circuit is not affected by its distance from the illuminator or by the attitude of inductor L7 relative to the near field. Those two variables only affect the amplitude of the signal and not its frequency.

Both body temperature and heart beat rate can be simultaneously monitored through frequency modulation by adding a piezoelectric crystal microphone to the FIG. 4 tuned circuit. The modified circuit is depicted in FIG. 5 and, in addition to the inductor L7 on core M1 and capacitor C7, includes the piezoelectric crystal microphone 40, resistor 41, voltage variable capacitor VC2, and diode D2. The capacitance of the voltage variable capacitor VC2 is controlled by the voltage generated by the piezoelectric crystal of microphone 40. The diode D2 prevents the crystal generated voltage from forwardly biasing the voltage variable capacitor VC2. The functioning of the FIG. 5 circuit is such that the heart beat rate results in a rapid modulation of the resonant frequency of the circuit compared to the slow frequency modulation caused by a change in body temperature. Thus, where the FIG. 5 circuit is initially tuned to resonate at frequency $f_1$ when the patient's body temperature is normal, the average frequency change from $f_1$ is a measure of the change in body temperature whereas the peak changes in frequency are a measure of heart beat rate. Therefore, the frequency modulation due to the heart beat rate is readily distinguishable from the slower frequency modulation due to body temperature change.

Where the circuit of FIG. 5 is employed, the tuned circuit TC2, normally carried by the patient, can be eliminated and the extent of the band swept by oscillator 26 can be narrowed as it is not then necessary to sweep through the $f_2$ frequency. Further, the A.M. detector 36 (FIG. 2) can be eliminated as the monitored information is obtained entirely from frequency modulated signals.

Because the invention can be embodied in various forms, it is not intended that the scope of the invention be limited to the precise apparatus here illustrated or described. For example, it is obvious to those familiar with frequency modulation techniques that a capacitor type microphone can be used to modulate the resonant frequency of a tuned circuit in lieu of employing a piezoelectric crystal microphone and a voltage variable capacitor. Moreover, although the invention has been described as utilized to monitor the bodily functions of a patient, it is apparent that the invention has other uses. For example, the invention can be employed to insure that a child remains within a predetermined area or to insure the presence of a person within a confined area, as in a jail cell. It is therefore intended that the invention be delimited by the appended claims and include those arrangements of apparatus that do not fairly depart from the essence of the invention.

What is claimed is:

1. A monitoring system comprising
   an illuminator having an electrical resonator for establishing a near magnetic field over an area to be monitored,
   means for driving the illuminator's resonator into resonance,
   means for sensing the resonant energy in the illuminator's resonator, the sensing means providing an information signal,
   a first resonant circuit carried by the monitored subject, the first resonant circuit being tuned to be set into resonance by coupling to the near field of the illuminator, and the first resonant circuit having means responsive to variations in a monitored state of the subject which alters the resonant condition of the first circuit,
   a second resonant circuit carried by the monitored subject, the second resonant circuit being unresponsive to variations in the monitored state of the subject,
   means remote from the subject for deriving a standard signal by causing the second resonant circuit to resonate through coupling to a near magnetic field, and
   means for comparing the standard signal with the information signal.

2. The monitoring system according to claim 1, wherein
   the second resonant circuit is tuned to resonate at a fixed frequency different from the resonant frequency of the first resonant circuit.

3. The monitoring system according to claim 1, wherein
   the means for deriving a standard signal comprises a second illuminator having an electrical resonator for establishing a second near field over the area to be monitored, the second near field oscillating at a frequency different from the frequency of the near magnetic field of the other illuminator.

* * * * *